April 13, 1943.                    W. W. McMINN                    2,316,349
                              HOLLOW TUBULAR MEMBER
                  Original Filed Oct. 30, 1937    2 Sheets-Sheet 1
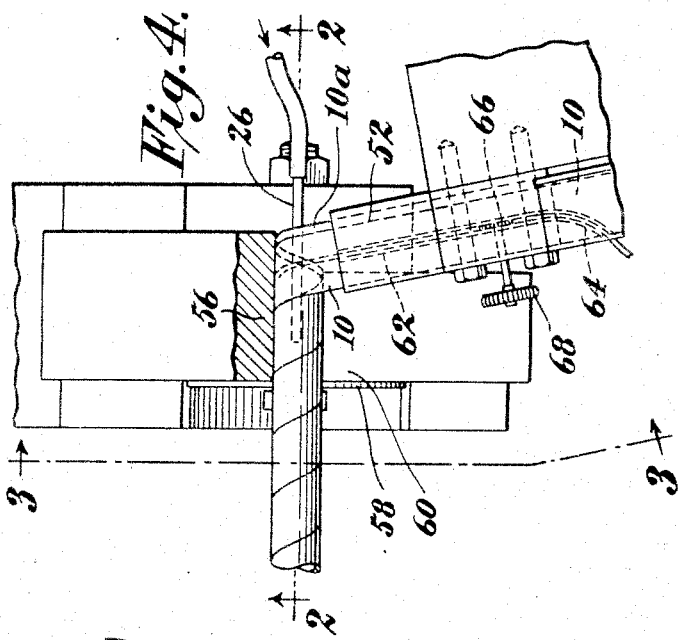
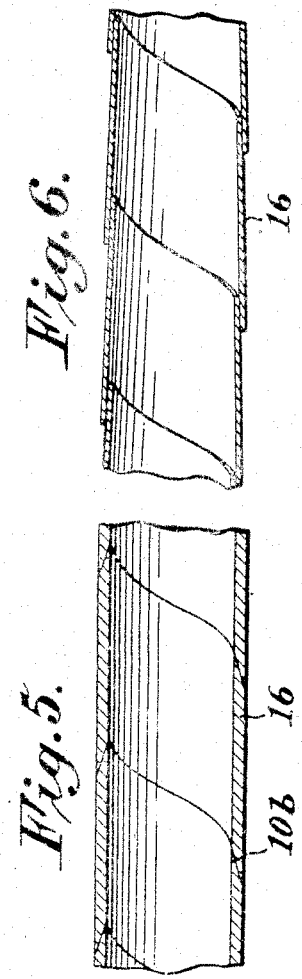
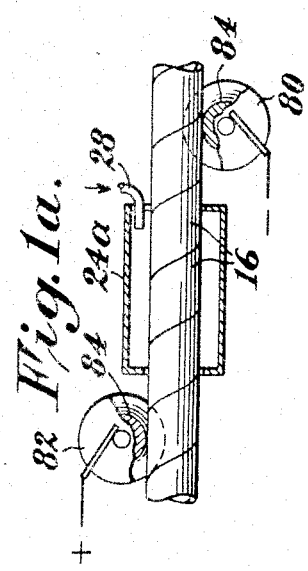
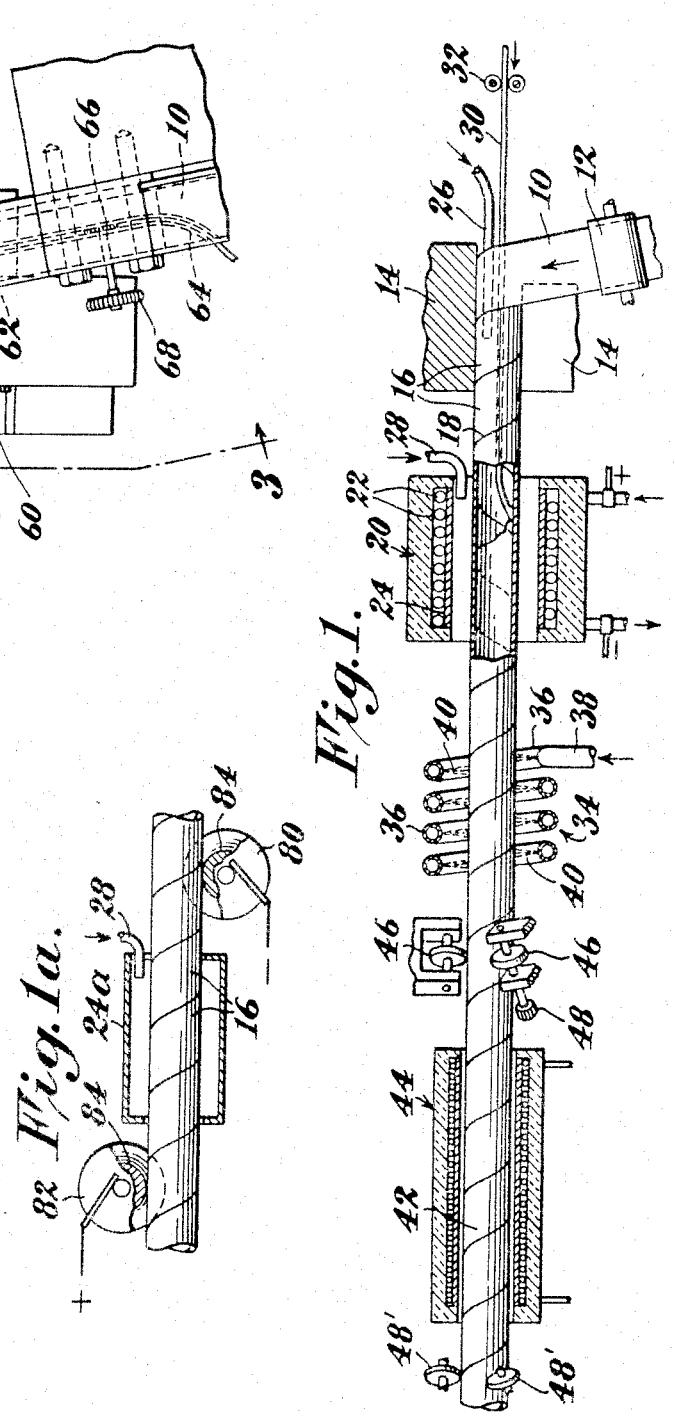
INVENTOR.
Wiley W. McMinn
BY
Jarvis Marble
his ATTORNEY.

April 13, 1943.  W. W. McMINN  2,316,349
HOLLOW TUBULAR MEMBER
Original Filed Oct. 30, 1937    2 Sheets-Sheet 2

Patented Apr. 13, 1943

2,316,349

UNITED STATES PATENT OFFICE 2,316,349

HOLLOW TUBULAR MEMBER

Wiley W. McMinn, Orange, N. J.

Original application October 30, 1937, Serial No. 172,053, now Patent No. 2,237,309, dated April 8, 1941. Divided and this application December 22, 1939, Serial No. 310,563

2 Claims. (Cl. 138—73)

This application is a division of my co-pending application Serial No. 172,053, now Patent No. 2,237,309, filed October 30, 1937, as a continuation-in-part with respect to my application Serial No. 30,045, filed July 5, 1935, and relates back as to common subject matter to said applications Serial Nos. 172,053 and 30,045.

The present invention relates to hollow tubular metal members of spiral wound form. More particularly, the invention relates to such members in which a blank of spirally wound convolutions of metal strip material is formed into an integral tubular member by sealing the seam between contiguous convolutions with a bonding metal of lower melting point than that of the strip fused into the seam. Still more p.rticularly the invention relates to members of the above kind made of ferrous metal and in which the bonding metal for sealing the seam is substantially non-ferrous.

The invention has for one of its principal objects the production of a new article of manufacture comprising hollow spiral wound metal tubing, the seam of which is sealed by bonding metal of low melting point relative to that of the strip material and which, as will hereinafter more fully appear, partakes of the physical characteristics of a seamless tubular member of the same material as that of the spiral wound strip. A still further object of this aspect of the invention is the production of thin walled spirally wound metal tubing of high quality ferrous material, the thickness and/or chemical analysis of which is such that methods heretofore available have not enabled wound tubing to be produced therefrom in a commercially practical manner.

Other and more detailed objects of the invention will appear as the following description proceeds, which description is to be considered in conjunction with the accompanying drawings forming a part of this specification in which:

Fig. 1 is a diagrammatic representation, partly in elevation and partly in section, illustrating in elementary form apparatus for carrying the invention into effect;

Fig. 1a is a diagrammatic representation of a variation of part of the apparatus shown in Fig. 1;

Fig. 4 is a view taken on the line 4—4 of Fig. 3;

Fig. 5 is a section on larger scale showing a different form of tubing than that illustrated in Fig. 1; and Fig. 6 is a view similar to Fig. 5, showing still another form of tubing.

Figure 2:
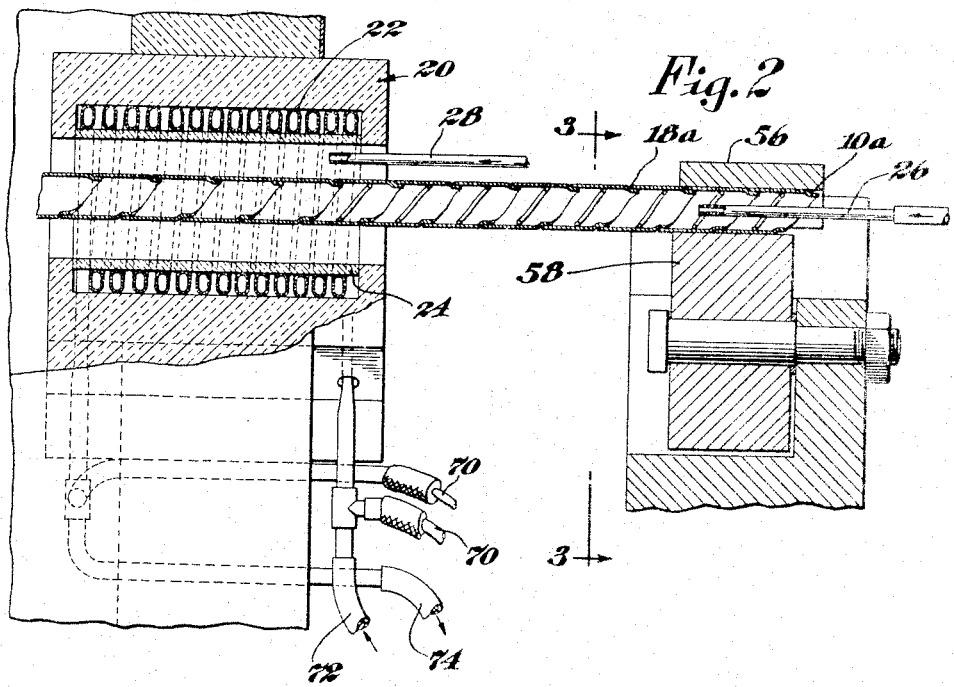
Fig. 2 is a more or less diagrammatic view, partly in section and on enlarged scale, of suitable apparatus for carrying certain steps of the invention into effect.

In order to attain the objects of the invention, I first wind a strip of metal of the desired kind, usually a ferrous metal such as steel, in a winding device of known form, to produce a hollow tubular blank having contiguous convolutions separated by a continuous spiral seam. The winding device may employ a mandrel but is preferably of the kind in which the strip is bent by forming dies so as to curl around itself without the aid of a mandrel. This type of winding is usually referred to as winding around an "air-core." When the material is spirally wound, the spirally formed blank rotates about its longitudinal axis as it leaves the winding device and at the same time the blank advances in axial direction along such axis away from the place of winding, and may be said to advance axially with rotary motion from the place of winding.

I heat the rotating and advancing blank to a desired temperature while the portion of the blank which is heated is still connected to the winding device, and feed a suitable bonding metal of lower melting point than that of the blank to the heated portion of the blank while it is still being projected from the winding device with its rotating and axial movements.

The portion of the blank which is heated is preferably heated in a reducing atmosphere if either the material of the strip or the bonding metal are of a nature such that they tend to oxidize at the melting temperature of the bonding metal. It will be understood of course that with bonding metal of relatively very low melting point, as for example a solder, some suitable flux may be employed in lieu of a reducing atmosphere, and further that in some instances it may be desirable to use a flux in addition to a reducing atmosphere. When the bonding metal is fed to the strip under the conditions stated, it is drawn by capillary attraction into the seam between contiguous convolutions and fuses with the metal of the strip to seal the seam and produce a continuous integral member from the spiral blank. Due to the continuous movement of the blank during this process, a uniform distribution of the bonding metal in the seam is obtained and I have found from experience that a perfect continuous joint between the adjacent convolutions is readily obtainable by this mode of procedure.

In order to secure proper film of the bonding metal in the seam, it is desirable that the walls of the seam be held together under closing pressure to provide for a capillary film of bonding metal in the seam. Furthermore, for the production of high quality tubing in which the joint shall have a strength comparable to that of the strip material, even though the bonding metal has a relatively low melting point and may also have substantially less tensile strength than the metal of the strip, the closing pressure on the walls of the seam at the place where fusion of the bonding metal takes place, as will hereinafter be more fully explained, is a factor of primary importance.

The invention is applicable to tubular members in which the strip may be wound so as to form a butt joint between the edges of the contiguous convolutions or to form a lap joint between them. With either form of joint the sealing of the seam while the blank is still unsevered from the winding device is important, since the nature of the blank is such that unwinding of the convolutions, causing opening up of the seam, is minimized so long as the blank is still unsevered from the strip being formed in the winding device.

In the case of a lap joint the tension produced by the winding device alone is more effective in keeping the seam tightly closed and the walls thereof in what may be termed pressure contact, which is desirable, than in the case of a butt joint. The reason for this is that with the lap joint, such unwinding as takes place in a severed member takes place from the end of the member last wound. Thus, with the lap type of joint, the walls of the seam are inherently held in pressure contact by the tension on the blank imposed by the winding device. With this tension imposed the convolution at the place of winding is prevented from unwinding and the convolution adjacent thereto is prevented from unwinding, since to unwind such convolution would have to increase in diameter and this increase is prevented by the over-lap of the convolution of fixed diameter held in the winding device. Similarly, further convolutions are prevented from unwinding by the over-lap of an adjacent convolution which is in turn indirectly prevented from unwinding by the convolution in the winding device.

Where a butt joint is produced, the inherent closeness of the seam due to winding tension is not so pronounced as in the case of a lap-joint, but experience shows that the seam nevertheless remains tighter with the blank attached to the winding device than if it were severed therefrom.

Regardless of whether a butt joint or lap-joint seam is employed, I prefer, for reasons to be explained later, to subject a blank to what may be termed an overwinding tension for the purpose of insuring continuous closing pressure between the walls of the seam until they are sealed by the bonding metal. The desirability of such overwinding tension is much greater in the case of a butt joint than a lap-joint, for reasons which will be apparent from the foregoing.

When the member to be produced is to be made of steel or other material which is subject to grain growth upon heating, the amount of such growth being dependent upon the factors of time and temperature, I minimize such grain growth in the manufacture of high quality tubing by passing the blank as it advances from the winding device through a heating zone in which the metal is brought very rapidly to a temperature above that of the melting point of the bonding metal. I prefer to secure the desired very rapid heating, which has other advantages in connection with my process as will hereafter appear, by passing the advancing blank through an electric furnace of the high frequency induction type so as to bring the metal to the desired temperature in the minimum space of time. The fusing of the bonding metal with the metal of the moving blank takes place comparatively rapidly and I have found that by the use of such a furnace, I am enabled to bring the metal to proper temperature and to fuse it with negligible grain growth.

In some instances the nature of the physical characteristics of the finished tubular member may be such that heat treatment of the material is required after the initial heating of the blank and sealing of the seam, in order to provide such physical characteristics. In order to provide for such heat treatment I may also employ the steps of quenching the heated blank after the sealing operation has taken place by causing the blank to advance through a quenching zone while still unsevered from the winding device and to thereafter pass through a further zone where the material is heated to desired drawing temperature.

With the foregoing general description in mind, I will refer to the diagrammatic illustration in Fig. 1 and in connection therewith describe suitable apparatus for carrying the entire process as described above into effect. In the figure, 10 indicates a continuous strip of material of desired composition advanced by feed rollers indicated at 12 to forming jaws or dies 14 in which the strip is wound to produce a blank having contiguous spiral convolutions 16 separated by the spiral seam 18.

Adjacent to the winding device which comprises the forming dies 14, there is located a heating furnace indicated generally at 20 and which in the present instance has been indicated as of the high frequency induction type. A suitable form of furnace of this kind comprises a spiral coil 22 of copper tubing acting as a conductor of high frequency electrical current and water cooled by the circulation of water therethrough. The coil of tubing is advantageously shielded and maintained out of contact with the metal of the blank by means of a tubular quartz shield 24. In this type of furnace the elements of the furnace itself are not at high temperature but any magnetic material passing through the coil is heated with extreme rapidity by the high frequency magnetic field until the temperature at which the material loses its magnetism is reached. Thereafter the heating is at a slower rate but in the present process by far the greater part of the heating is within the magnetic range of the metal and consequently the desired temperature for the fusing operation is obtained with great rapidity.

As will be apparent, the present invention is not limited in its application to metals having the magnetic properties of steel and in instances where the magnetic properties of the metal would not lend themselves to rapid heating by induction, the desired rapid heating may advantageously be effected by other means, as for example, the direct resistance heating indicated in Fig. 1a. In the apparatus shown in this figure the convolutions 16 of the advancing blank are contacted by rotatably mounted rollers 80 and 82, the peripheries of which are advantageously grooved as indicated at 84 to contact the surface of the blank. The rollers are spaced apart as indicated in the figure and constitute contact means for placing the section of the blank between the rollers in an electric heating circuit, the metal in the section between the rollers being heated by direct resistance to flow of the current therethrough. It will be evident that by causing a heavy current to flow through the section, the metal can be brought to desired temperature very rapidly and the necessity for a long heated section, even though the speed of axial travel of the blank is relatively high, can be avoided. It will, of course, be evident that with this type of heating device, the magnetic quality of the metal being heated is an immaterial factor.

As shown in the figure, the forming dies 14 are of the type for "air-core" winding of the blank and the absence of a mandrel permits the ready introduction of a gaseous medium into the interior of the blank from the winding end which will maintain a reducing atmosphere within the portion of the blank which is in the heating furnace. Preferably hydrogen is introduced for this purpose through a supply pipe indicated in Fig. 1 at 26 and a hydrogen atmosphere is maintained around the portion of the blank in the furnace by means of a hydrogen supply introduced through the pipe 28. Where hydrogen is supplied externally with heating means of the kind shown in Fig. 1a, the heated section of the blank is surrounded by a tube 24a for the purpose of confining the hydrogen atmosphere around the blank.

The bonding metal employed is shown as introduced in the form of a wire 30 passing through the "air-core" about which the blank is wound and fed at predetermined rate through the feed rollers indicated at 32. As will hereinafter more fully appear, other modes of feeding the bonding metal may be employed.

If, as previously noted, the nature of the material of the blank is such that heat treatment is desired, the advancing blank is passed through a quenching zone indicated generally at 34, in which zone the heated blank is cooled at desired rate. For purposes of illustration, I have shown this quenching zone as being provided by a perforated coil 36 to which cooling fluid is supplied through the inlet conduit 38 and from which such fluid is sprayed as at 40 onto the blank. The fluid employed may be water, oil, air, or any other desired fluid, depending upon the quenching rate which is desired.

If the material is to be tempered by drawing, the advancing blank is then passed through a second heating zone indicated at 42 in which the temperature of the blank is again raised to desired degree by any suitable means, which in the illustrated embodiment has been shown as an electrical resistance furnace indicated generally at 44.

The form of blank shown in Fig. 1 has a butt joint between contiguous convolutions and as previously noted, when this form of joint is employed it is particularly desirable to keep the portion of the blank in the initial heating zone under a wrapping tension so as to maintain the seam as tight as possible. To this end, I provide, as shown at 46, a series of rollers frictionally engaging the blank to support it in proper alignment and including one or more rollers driven through suitable gearing indicated at 48 so as to turn with at least as high a peripheral speed as the speed of rotation imparted to the blank by the winding device and advantageously with a slightly higher peripheral speed, the over- speed of the rollers, if any, being compensated for by slip between the driven roller or rollers and the blank. It will be evident that if there is any over-drive of the rollers, the wrapping or over-winding tension imparted to the blank by such rollers should be of sufficiently low value to not distort the blank.

Other supporting rollers such as are indicated at 48 may be placed wherever desired and the blank after passing through the final step of the process, whichever step this may be, is then cut to provide integral tubular members of desired length.

Figure 3:
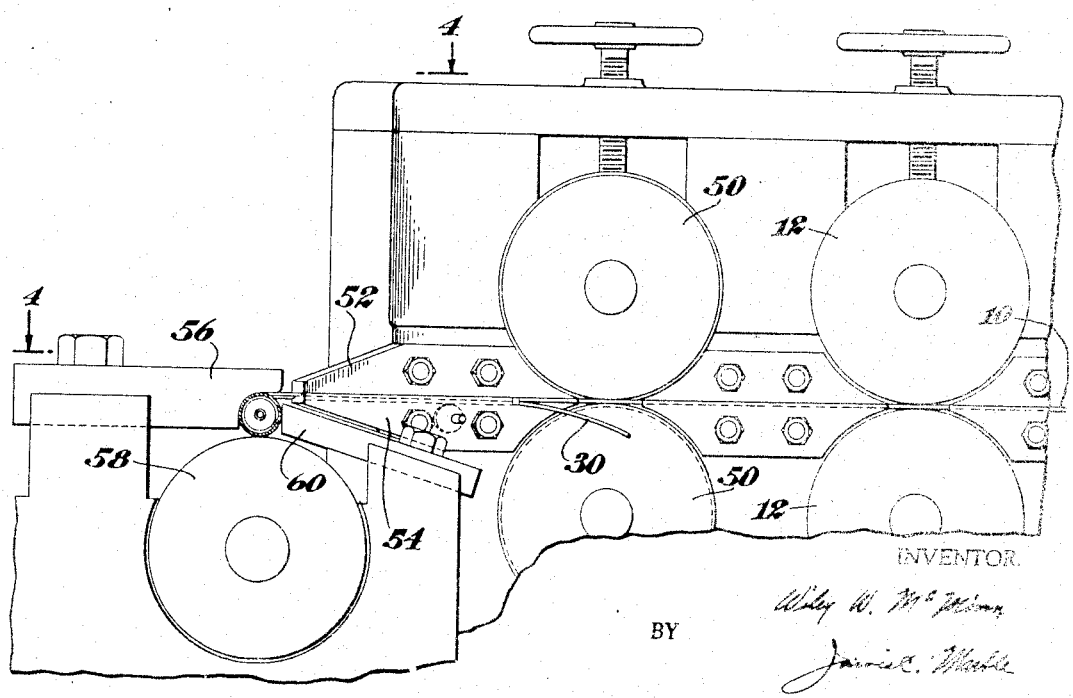
Fig. 3 is a view taken on the line 3—3 of Fig. 2.

Referring now to Figs. 2 to 4, I have shown in more detail, apparatus which I have successfully employed in producing brazed hollow tubular members having a lap-joint seam. As shown in these figures, the steel strip 10 is passed first through feed rollers 12 driven at desired speed by mechanism not shown and is then passed between a pair of forming rollers 50 which form an offset flange 10a (see Fig. 4) at one edge of the strip. After passing through the forming rollers, the flanged strip is fed through feeding jaws 52 and 54 to a suitably contoured forming die 56 which cooperates with roller 58 and die 60 to wind the strip into the desired spiral blank having the lap-joint seam indicated at 18a.

The feeding jaw 54 over which the strip passes is provided with a longitudinal groove 62 (see Fig. 4) one end of which is curved laterally as at 64 to the side of the jaw. Through this groove, the bonding metal is fed in the form of a wire which wire tends to be carried along at the speed at which the strip is fed by frictional contact with the strip. This feed may advantageously be assisted by means of a knurled roller 66 between which and the strip the wire passes and which roller may advantageously be driven at desired speed by means of suitable gearing indicated at 68.

As will be observed from Fig. 2, the bonding material when fed in this manner takes the form of a spiral coil wound within the tubular blank, the wire melting as the high temperature zone is reached and flowing into the seam to seal it. As further shown in Fig. 2, the high temperature heating zone is provided by an electric furnace of the induction type, the construction of which is such as that described in connection with Fig. 1, comprising the hollow pipe coil 22 surrounding the tube 24 and carrying high frequency alternating current supplied through the leads 70. Cooling water is supplied to the coil 22 through the inlet 72 and is discharged therefrom through the outlet pipe 74.

In this embodiment, as in the arrangement shown diagrammatically in Fig. 1, hydrogen is introduced around the portion of the blank in the furnace through the pipe 28 and is supplied to the interior of the blank through the pipe 26.

I have found that with apparatus of the character hereinabove described, it is possible to form an integral hollow tubular member in which the bonding metal forms the sole mechanical or structural connection between contiguous convolutions and which has physical characteristics similar to those that would be expected from a seamless tubular member made of the same metal as that of the spirally wound strip. Moreover, I have found that I can produce spiral wound members having the general physical characteristics of the metal of the strip even when the bonding metal has a lower melting point than that of the metal of the strip and even a substantially lower tensile strength.

The above holds true even in cases where the metal of the strip is high grade material such as high carbon steel, which when heat treated has a tensile strength of the order of one hundred thousand to two hundred thousand pounds per square inch, and the bonding metal is, for example, of copper or a copper alloy having a tensile strength which is less than, and in certain instances very much less than, half that of the metal of the strip. Further, I am able to produce tubing of high grade strip metal which is very thin so as to produce thin walled tubing and this tubing, consisting of thin walled high grade material and a relatively low melting point bonding metal has physical characteristics of the order of those of seamless tubing of the same metal.

In order to obtain high grade spiral wound tubing in which the seam is sealed with relatively low melting point metal and which is comparable to seamless drawn tubing in its physical characteristics, the most important single factor, in so far as I have been able to determine, is that of the thickness of bonding metal between the walls of the seam. In order to produce high quality tubing it appears essential to have the walls of the seam maintained in as closely confronting and contacting relation during the time when the bonding metal is fused in the seam as is practically possible, and to this end the most desirable condition is to have the walls of the seam maintained constantly during this period in what may be termed pressure contact.

When the walls are maintained in pressure contact it will be evident that the film of bonding metal will be very thin and the thin film characteristic of high quality tubing produced by my method may be termed a capillary film since if the bonding metal is fed from the outside of the seam it will be drawn thereinto by capillary attraction.

By way of example I have found from actual test that tubing in which the film of fused bonding metal has an average thickness of the order of .0005 of an inch is as strong as the metal of the strip of which it is made even though that metal be high quality heat treated steel. On the other hand, if the average thickness of the fused bonding metal is materially greater, for example, of the order of .002 of an inch or more, strength of joint of the order of the strength of the strip material cannot be depended upon in the case of high grade strip material.

For the production of high grade tubing in which the strength of the joint is to be of the order of high grade heat treated steel, I employ an over-lapping joint rather than a butt joint.

In addition to the offset lap-joint shown in Fig. 2, a scarf joint as shown in Fig. 5 may be employed, which is formed by beveling the edges of the strip metal as at 10b. Alternatively, the strip material, particularly if thin walled tubing is employed, may be wound with an over-lap but without either beveling of the edges or offsetting the margin, the form of tubing thus produced being illustrated in Fig. 6. Obviously, other specific forms of over-lapping joints may be employed and for the purposes of this specification, all over-lapping joints inclusive of the several forms herein illustrated will be referred to generically as lap-joints.

With reference to the factor of high strength of joint at the seam, close contact of the seam walls as previously noted is highly important. In the case of lap-joint tubing the pressure contact resulting from the blank being unsevered from the winding device at the time the seam is sealed may be sufficient without further aid to enable a very strong joint to be produced. However, I prefer and consider it to be of material value when making high grade strong tubing, to employ the overwinding feature previously described. Such overwinding, while it may not be essential in all cases, is highly desirable from the standpoint of insuring reliable production of the high quality product desired. In the case of butt joint material, the overwinding feature should in all cases be employed if a joint of substantial strength is to be obtained.

I have further discovered that by the exercise of my invention, a high quality product can be obtained which not only has the tensile strength characteristics of high quality heat treated steel, even when the tubing is bonded with relatively low melting point bonding metal, but also in certain of its forms has other highly desirable and wholly unexpected physical characteristics. Among the most striking of these additional characteristics is that with a lap-joint seam having a thin capillary film of bonding metal, the seam will not fail under cold working operations performed on the tubing and of such severity that cold flow of the metal of the strip forming the walls of the seam is obtained. This is particularly true in the case of a scarf type lap-joint which produces a tube of substantially uniform wall thickness. Where the thickness of metal at the joint is substantially the same as at other places in the tube, I have found that the tube may be swaged or otherwise worked to an extent very appreciably changing the wall thickness of the tube at the joint. Also, with the scarf and other types of lap-joints, I have found that tubing may be bent through a wide arc on a radius as little as three diameters without rupturing the seam.

Because of the relatively greater strength characteristics that can be obtained with tubing embodying my invention, it is possible to produce tubing of a character which cannot be practically produced by any known welding process. In welding practice as at present known, the minimum thickness of metal which can be readily welded commercially is of the order of .030 of an inch. In actual commercial practice the minimum thickness usually employed is at least .035 of an inch. The present invention contemplates, inter alia, high grade steel tubing having a wall thickness of .013 of an inch and less. I have also made like tubing as thin as .010 of an inch wall thickness and in so far as the present invention is concerned, this latter thickness does not appear to be or even closely approach the minimum thickness of which commercially practical tubing can be made.

It is also well recognized in the art that reliable welds cannot be obtained with high carbon steels. As the carbon content increases above a value of the order of .40% carbon, any welding operation becomes increasingly difficult and the weld becomes increasingly unreliable, particularly with age. The present invention is not subject to this limitation, for while tubing which in physical strength characteristics is comparable to welded tubing can be produced by the present method, the range of steels which may be employed is much greater. I have, for example, produced in commercial quantities tubing of steel having a carbon content of the order of 1% and in so far as this invention is concerned, this does not represent the limit of carbon content.

Furthermore, with welded tubing the grain structure and chemical analysis of the metal at the weld is seriously disturbed, the welded portion being non-homogeneous as regards the remainder of the tubing and not responding uniformly to heat treatment. On the other hand, tubing embodying the present invention is homogeneous as to all of the metal in the wound strip except, of course, for the bonding metal and as has been previously pointed out, the seam when properly bonded may have the strength of extremely strong steels.

Tubing embodying the present invention also has in addition to the factor of cost, substantial advantage over seamless drawn tubing of the same material. With tubing wound from strip material, uniformity of wall thickness can be maintained very readily due to the very ready control of thickness in manufacturing strip material. On the other hand, seamless drawn tubing can be made with uniform wall thickness only by very expensive precision manufacture, not employed in the usual commercial grades of seamless tubing which vary materially in wall thickness due to absence of exact concentricity of bore.

A wide variety of metals may be used for bonding metal. Advantageously, metals ordinarily regarded as brazing metals are employed, although other metals of lower melting point than steel may be used as desired, such for example as silver solder and the like. I have found that yellow brass of commercial specification, that is, of the order of 65% copper and 35% zinc, is suitable for making strong tubing of the kind hereinbefore described. For the purposes of this specification, all metals suitable for brazing and having substantial copper content will be referred to generically as cuprous metal.

It is also to be noted that while for simplicity of illustration and explanation, I have shown the manufacture of tubular members of uniform cylindrical shape, the invention also includes members which may be wholly or in part of tapered form. When such members are to be produced, a winding device may be employed which delivers a continuous blank consisting of tapered sections which alternately increase in diameter and decrease in diameter. A continuous blank of tapered sections may be manifestly treated in substantially the same manner as the continuous straight cylindrical blank which has been shown herein by way of illustration.

It will further be evident that other specific forms of apparatus for heating, feeding or bonding metal, quenching, etc., may be employed within the scope of the invention, depending upon the character and form the blank and the desired character of the finished product.

I have found the invention to be particularly advantageous for providing thin steel tubular members used for the shafts of golf clubs and the like where uniformity of shape and also of strength is highly important. It is to be understood, of course, that the invention is in no way limited to tubular members to be utilized for shafts, but is applicable to the manufacture of tubular structure for any desired use.

What is claimed is:

1. As a new article of manufacture, a hollow tubular metal member consisting of a strip of ductile ferrous metal wound into a series of spiral convolutions providing an axially straight walled member having a spiral scarf lap-joint seam between said convolutions forming an article having substantially uniform wall thickness, the walls of said seam being joined by the fusion therewith of a film of cuprous bonding metal having a lower melting point and substantially less tensile strength than the metal of the strip and the joint produced by such fusion constituting the sole structural connection between the adjacent convolutions, said hollow member having tensile strength at least as great as that of the strip material and having ductility enabling the member to be cold worked, without rupturing the seam, to an extent causing substantial plastic flow of the metal at the seam.

2. An article as defined in claim 1 wherein the strip is of a thinness below and the carbon content is above the ordinary commercial welding range.

WILEY W. McMINN.